United States Patent
Bottomley

(10) Patent No.: US 7,328,319 B1
(45) Date of Patent: Feb. 5, 2008

(54) REMOTE ASYNCHRONOUS MIRROR RECOVERY

(75) Inventor: James E. J. Bottomley, Oswego, IL (US)

(73) Assignee: SteelEye Technology, Inc., Palo Alto, CA (US)

( * ) Notice: Subject to any disclaimer, the term of this patent is extended or adjusted under 35 U.S.C. 154(b) by 549 days.

(21) Appl. No.: 10/888,853

(22) Filed: Jul. 12, 2004

(51) Int. Cl.
*G06F 12/16* (2006.01)

(52) U.S. Cl. ..................... 711/162; 707/204

(58) Field of Classification Search ............. 711/162; 707/204
See application file for complete search history.

(56) References Cited

U.S. PATENT DOCUMENTS 6,594,676 B1 * 7/2003 Moore .................. 707/202
7,082,446 B1 7/2006 Bottomley
2005/0071391 A1 * 3/2005 Fuerderer et al. .......... 707/204

OTHER PUBLICATIONS

David Krovich; DRBD HOWTO; http://www.slackworks.com/~dkrovich/DRBD/.

* cited by examiner

*Primary Examiner*—Jack Lane

(57) ABSTRACT

For a highly available replication system, a process is presented whereby, after a successful failover from primary to replica, with the replica now being the new primary, and where, at a later time, the original primary is subsequently restored to operation, a subset close to the minimal possible subset of data that needs to be transferred between the new and original primaries can be computed.

10 Claims, 6 Drawing Sheets

REMOTE ASYNCHRONOUS MIRROR RECOVERY

BACKGROUND OF THE INVENTION

The present invention pertains to the field of Disaster Recovery. Disaster Recovery is usually implemented as a protected service operating on a store of data. An external entity (referred to as the Disaster Recovery system) usually transfers the service and the protected data to a place where it can continue operation in the event that a failure occurs in the original service exporting entity. An implementation common in the art protects the data using replication. The service protection is then separately achieved by another system, however the exact mechanism by which this protection operates is not relevant to the present invention.

FIG. 1 illustrates a process for replicating data such as is well known in the art having a primary 501, with its associated data set on permanent storage 502, which is connected to a network 503. Network 503 is routed onto the Internet 504, which is depicted in the figure as a Wide Area Network (WAN Cloud) but which may be any network type, or even where the primary and replica data set may be located within a single computer system and thus not require an external network connection, which ultimately connects to a different network 505. The replica 506 also having a storage device 507 for receiving a replica of the data set and being connected to network 505. Thus, a write to the data set on the primary storage 502 may be encapsulated into a network datagram and sent over networks 503, 504 and 505 where it is received at the replica, unencapsulated and sent down to the replica data set on storage 507. This operation is functionally equivalent to direct replication 508 from the primary data set on 502 to the replica data set on 507.

Such a replication mechanism may form the nucleus of a Disaster Recovery system where a process (of which many exist in the art) transfers the roles of primary and replica when the disaster strikes the primary.

Since the replica is tracking the updates to the primary, there are many times during the operation of replication where data has changed on the primary, but this change has not yet been committed by the replica. These changes are recorded in a log on the primary. If something happens to the primary, the resulting tear down of the replication system may mean that some of the changes never make it to the replica.

Such replication tear downs may simply be transient: the result of interrupted communications (a not uncommon occurrence even with modern networks), or may be fatal: caused by some type of disaster at the primary. In the event of a transient tear down followed by a subsequent restoration of the connection, the primary and replica need some way to transmit just the subset of the data that has changed in the interim (since transmission of the full data set is usually prohibitively expensive).

The method of tracking only the subset of changes most commonly used in the art is that of logging. There are two well known logging types: transaction and intent. In a transaction log, the data that has changed along with its location information is recorded in a time ordered log. When the replica acknowledges that the data is safely stored, its corresponding log entry is erased. In an Intent Log, only the location of the data, not its contents is recorded (the record again being erased when acknowledgement from the replica is received). Intent logs tend to be allocated as fixed size entities (with one dirty indicator for a given unit of data, called a chunk), and the records they maintain are not time ordered. In either case, following the restoration of a previously torn down replication session, the log may be consulted to determine the set of data that needs to be sent to the replica to bring it up to date. Each logging type has benefits and disadvantages; however, this is not pertinent to the present invention and will not be discussed further.

In the event of a fatal tear down of replication, an external disaster recovery mechanism may pick up operation of the service on the replica by reversing the roles of primary and replica. During such operation, the replica becomes the new primary (because it must now alter the data that it merely tracked before in order to maintain the operation of the external service which relies on the said data). Ultimately, the original primary may be restored to service; however, because the service is now being exported from the new primary (the original replica), the data must be synchronised between the new and original primaries before operation of the service may be transferred back to the original primary.

The current state of the art for a process for reversing roles by transferring service back to the original primary is to require a complete transfer of data from the new primary (although the network utilisation may be reduced by comparing cryptographic checksums of the pieces of the data on the primary and the replica to see if they agree rather than blindly transmitting all the data).

BRIEF SUMMARY OF THE INVENTION

The present invention advances the art by permitting the computation of the subset of the data that needs to be transmitted from the new to the original primary on restoration of the original primary to service to bring them both into synchronisation from a priori information contained in both the computers, rather than having to assume this set is the entirety of the data, or by having to compute it on the fly by comparing data checksums across the network.

The present invention uses the logs contained in both the original and the new primaries to deduce the subset of changed data. As will be shown in the detailed description, this subset is reasonably close to (although not necessarily exactly identical to) the smallest subset possible. However, it is usually much smaller than the entire data set, and is arrived at using existing knowledge, rather than having to compute it on the fly like the checksum comparison method.

Once this subset has been computed, it is a simple matter to transmit all the information in this subset from the new to the original primary. Once this transmission has been accomplished, the original primary is an exact duplicate of the new primary, and may begin life as a replica to the new primary.

DETAILED DESCRIPTION OF THE INVENTION

Details of the current embodiment will be presented in terms of the two common logging types in the art: transaction and intent logs. Although, it must be appreciated that nothing precludes the use of other log types with this method, since the data they would contain must be reducible at the least to an intent log, which contains the minimum amount of information necessary to describe data differences between the primary and the replica, and thus each log could be converted to an intent log prior to beginning this process.

i. Beginning with an Intent Log

Figure 1:
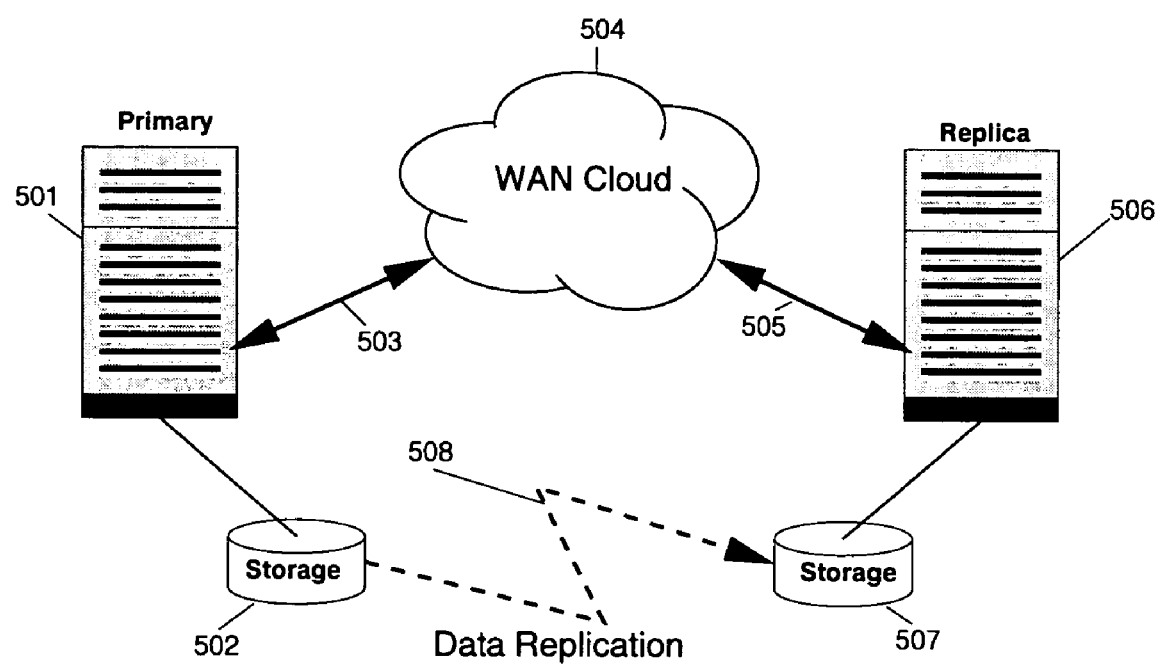
FIG. 1 illustrates the set up of data replication as is well known in the art
Figure 2:
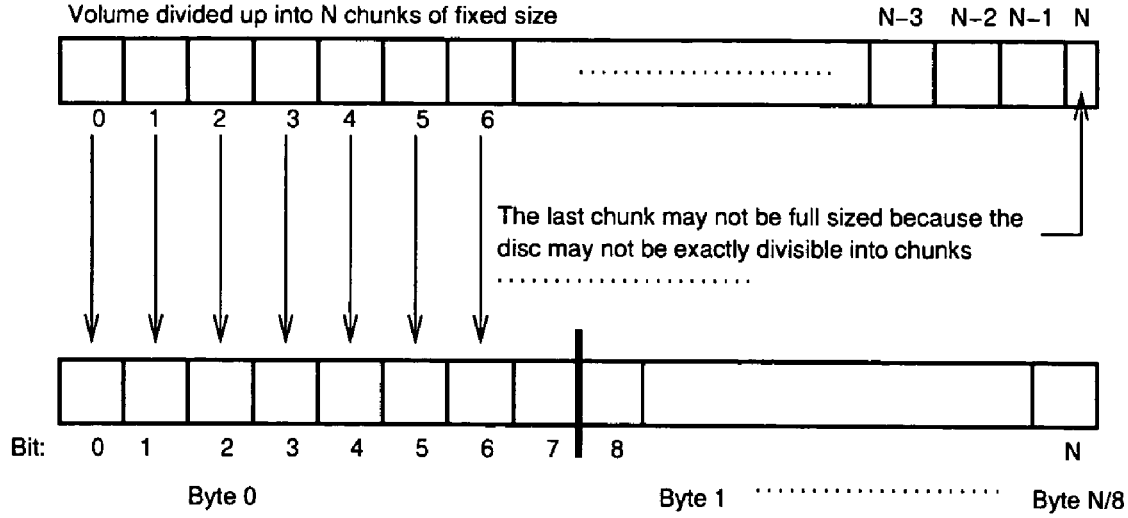
FIG. 2 illustrates the division of a volume into fixed size chunks.

In order to begin with an intent log, the data areas of both volumes (which are identical in size) are divided up into chunks of fixed length which for efficiency may be multiples of the underlying disk sector (see FIG. 2). Once this is done, an intent log contains an indication (among other things) of whether a particular chunk is dirty (needs to be transmitted from the primary to the replica) or is clean (is known to be identical on both the primary and the replica). As the replication system operates, the dirty indication is set just prior to updating data within a primary chunk, and is cleared after the signal comes back from the replica that it has also safely stored a copy of the updated data. Thus, the log always points to a set of sectors marginally larger than those that really are out of sync (because the chunk will remain marked dirty from the time the replica updates it's chunk to the time the signal is received and the primary clears the indication). However, the replication system may contain a limit on the maximum amount of in flight data (the amount of data updated on the primary, but still in-transit to the replica), which limits the number of chunks which may be listed as dirty.

When the primary crashes, and operation is transferred to the replica, all data changed during this recovered operation will be marked as dirty in the log of the original replica (now the new primary) since there is nothing to receive the data on the other end of the replication system until the system originally performing the role of primary, designated original primary is restored.

Once the original primary is restored to service, assuming nothing damaged the original replication logs during its outage, a file is created from the log called the dirty bitmap, effectively representing, via a single bit, whether a particular cluster is clean or dirty.

Figure 3:
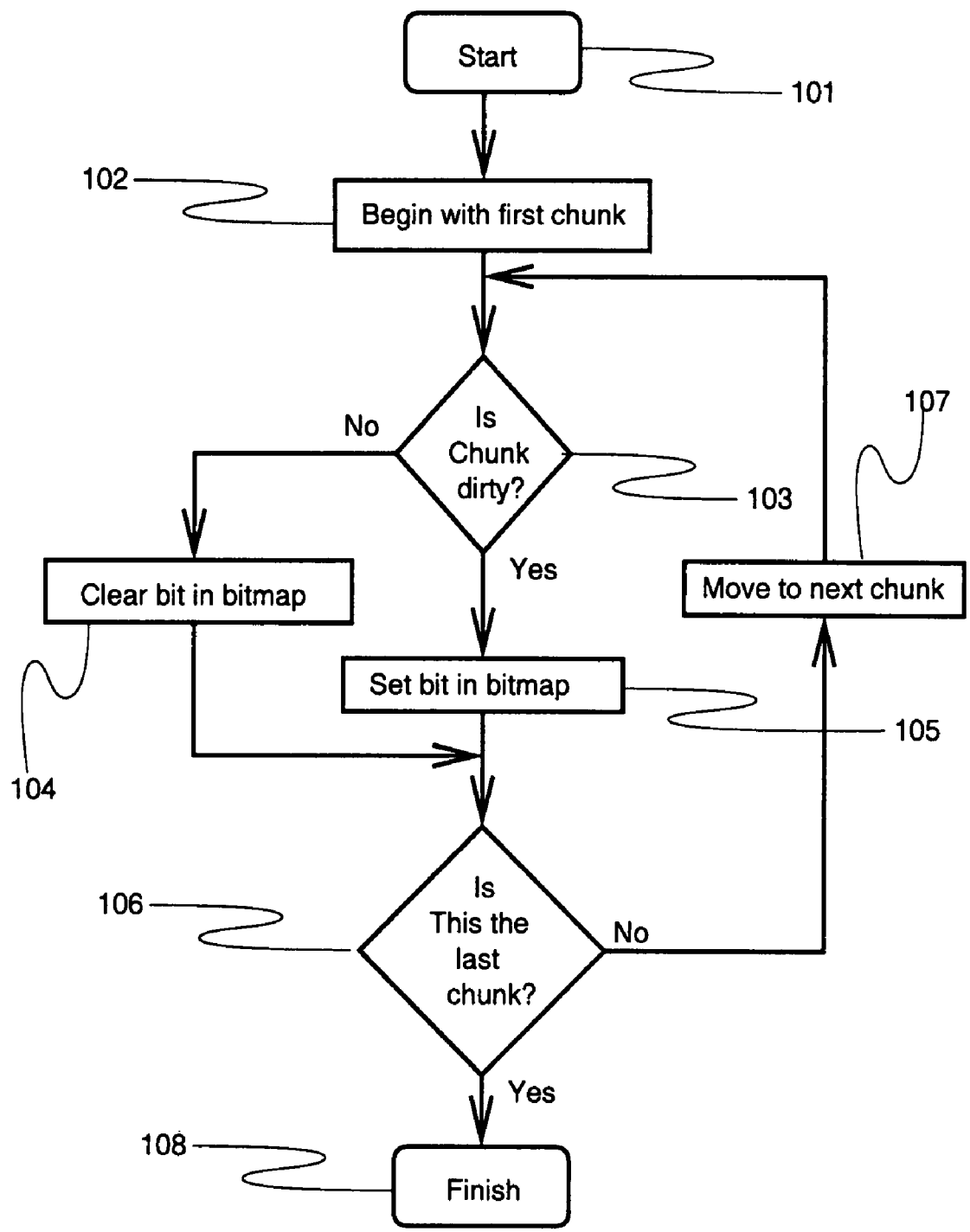
FIG. 3 illustrates the process for creating a bitmap from an intent log.

How this works is detailed in FIG. 3, the process begins at 101. It starts with the first chunk (of a previously chunked device as per FIG. 2) at 102. At 103, the volume's persistent intent log is checked to see if the chunk is clean or dirty. If it is clean, the process proceeds to 104 where the corresponding bit in the new bitmap is cleared. If it is not clean, the process proceeds to 105 where the corresponding bit is set in the bitmap. At 106, the chunk number is tested. If it is not the last chunk, then the chunk number is incremented (at 107) and the process loops around to 103 or, if it is the last chunk, the process finishes at 108.

ii. Beginning with a Transaction Log

As is well known in the art, a transaction log is simply a list of data and the positions the said data is to be stored on the replica volume. This list is time ordered, and may contain data of varying size and position.

Figure 4:
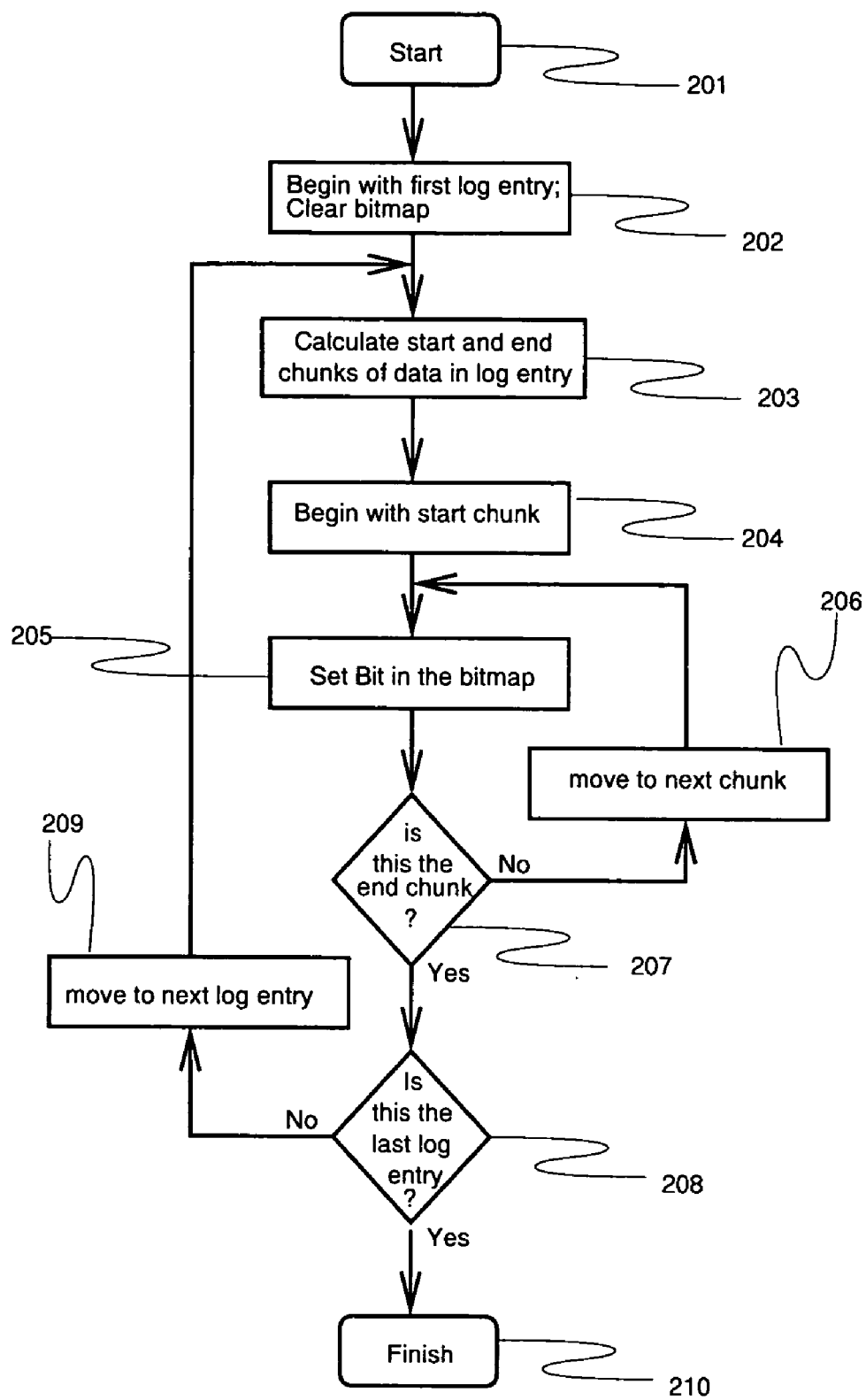
FIG. 4 illustrates the process for creating a bitmap from a transaction log.

How a transaction log is converted into a bitmap is detailed in FIG. 4, the process begins at 201. At 202 the process then clears (sets entirely to zero) the bitmap and starts with the first transaction log entry. At 203 the process calculates the start and end chunks of the data (note that this is the smallest set of contiguous chunks that entirely covers the data entry in the log, and may be larger than the actual data size in the said log entry). At 204 the process begins with the start chunk and at 205 sets the corresponding bit in the bitmap (this bit may be either set or clear, but it now becomes unconditionally set). At 207 if this is not the end of the set of chunks covering the data, the process moves to the next chunk at 206 and loops around again to 205. When the last chunk is reached, the process checks, at 208 to see if this log entry was the last one. If it was not the last log entry, the process moves to the next log entry at 209 and then loops around to 203.

iii. Combining the Logs on the New Primary

This section describes a process for combining the log saved on the original primary with the log on the new primary such that the subset of data that needs to be transferred between the original and the new primaries to make data on the original primary an exact duplicate of the data on the new primary is computed.

When either of the above processes is completed, given that the data set had N chunks, the process creates a bitmap of size N/8 bytes representing the clean/dirty state of each of the chunks.

This process is done for the logs of both the original and new primaries, yielding two separate bitmaps, each of N/8 bytes. The bitmap from the original primary is then transferred to the new primary using the network protocols readily available in the art. It is particularly advantageous that this quantity is much smaller than the original data set. For example, given an original data set of ten gigabytes in size, and choosing a chunk size of 32 kilobytes, the entire size of the bitmap is only 40 kilobytes in size, a tiny quantity to transfer over the network.

Figure 5:
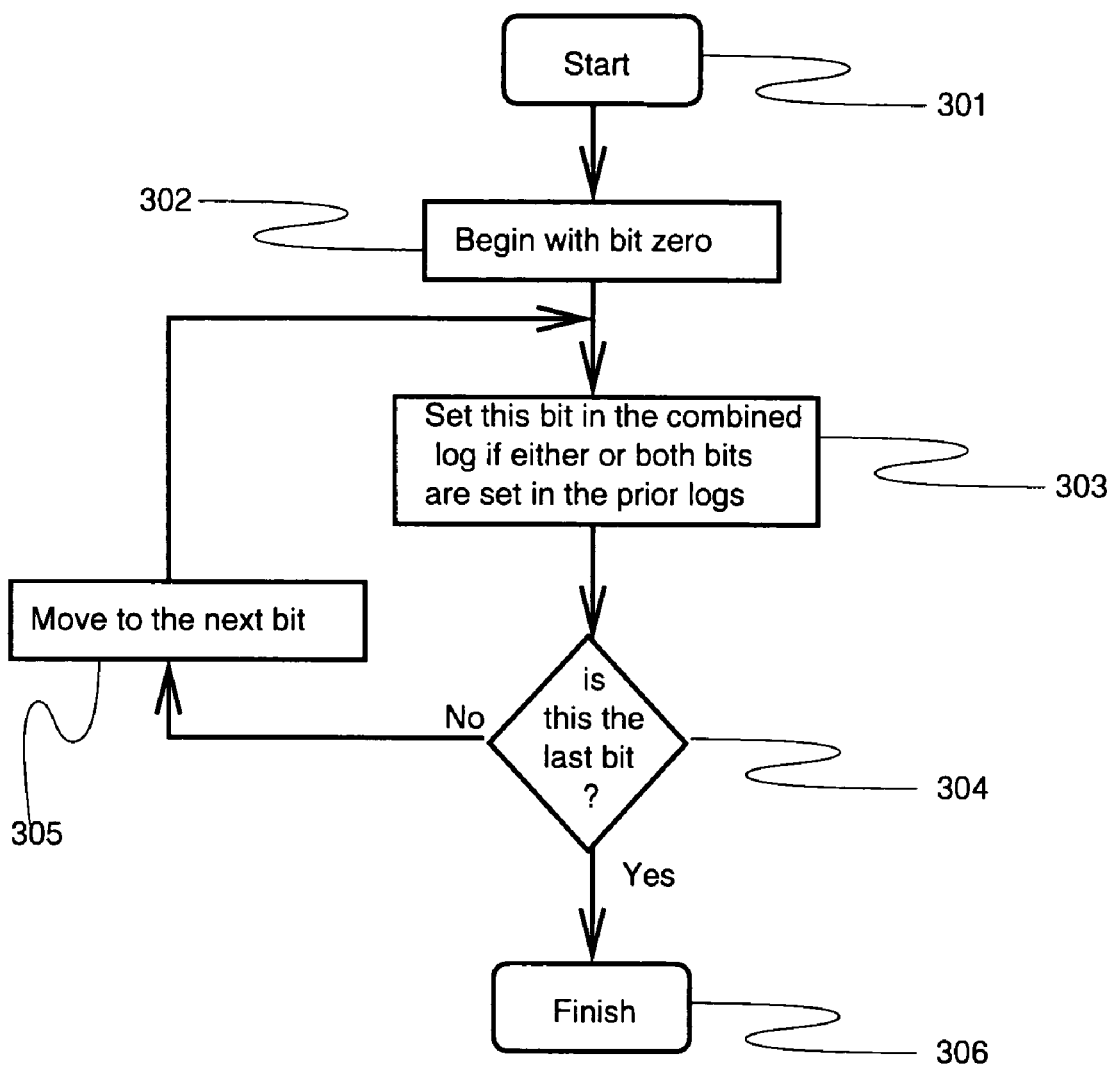
FIG. 5 illustrates the process for producing a combined bitmap from the individual bitmaps of the original and new primaries.
Figure 6:
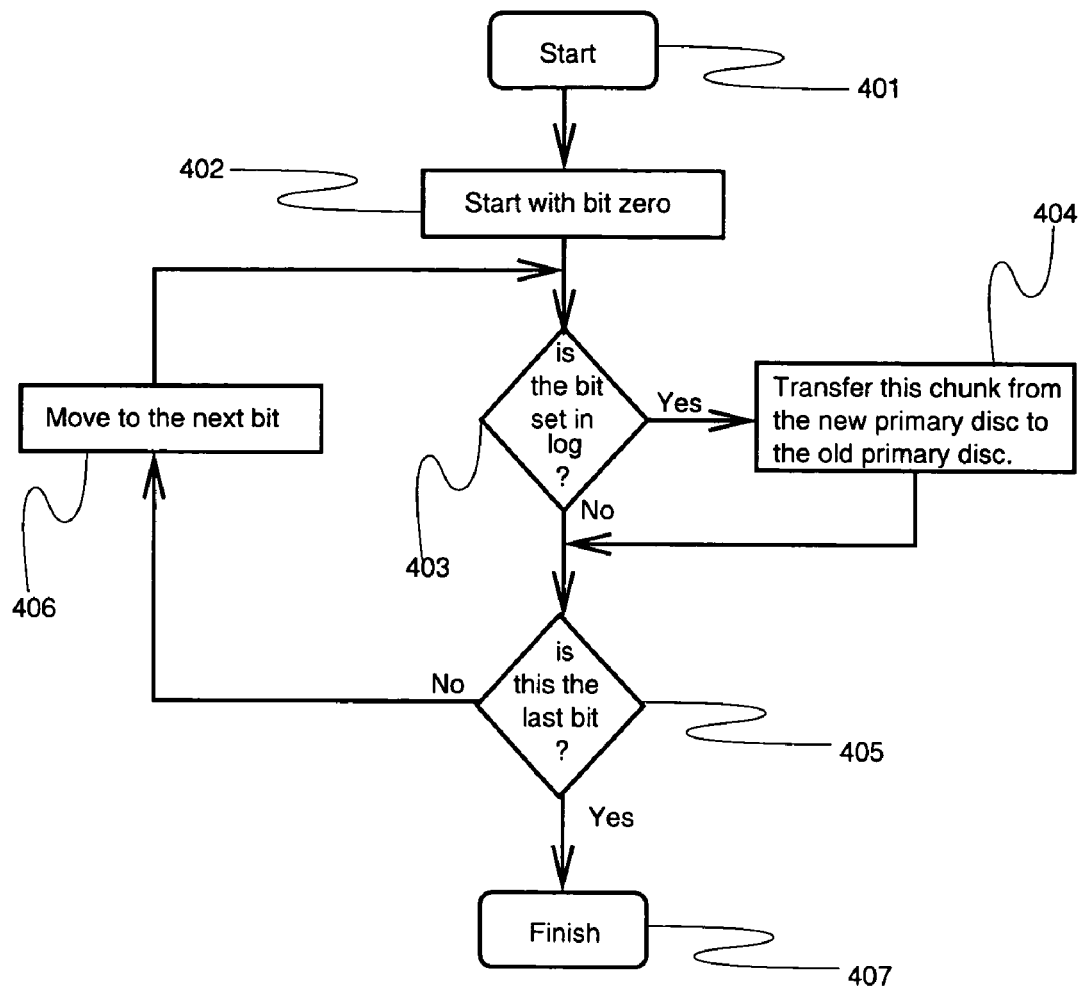
FIG. 6 illustrates the process by which the combined bitmap is used to bring the original primary to being an exact duplicate of the new primary.

Once both bitmaps are present on the New Primary, they are combined using a bitwise or operation where a bit is set in the combined log if either a bit is set in the original primary's log, or a bit is set in the new primary's log, or a bit is set in both logs. This process is illustrated in FIG. 5 which starts at 301 with bit zero at 302. At 303 if either or both of these bits is set in the original and new primary logs, the corresponding bit is set in the combined log. If this is the last bit at 304 then the process completes at 306 otherwise, the current bit is incremented by one at 305 and the process loops around to 303 again. For ease of computation the or operation may be done in units of bytes, words, long words (or any other division that makes calculation most easy). This combined bitmap represents the subset of data that needs to be transferred between the original and the new primaries to make the data on the original primary an exact duplicate of the data on the new primary.

iv. Replaying from the New to the Original Primary According to the Combined Log Once the combined log is obtained, the process for replaying this log is illustrated in FIG. 6. This process begins with the combined bitmap derived above, starts at 401 and begins with the first bit in the bitmap at 402 if, at 403 this bit is set, then at 404 the entire chunk the bit corresponds to is transferred from the new to the original primary if, at 405 this is the last bit, then the process ends at 407; otherwise, it moves to the next bit at 405 and loops around to 403.

Once this process is completed, the new and original primaries are exact duplicates of each other.

v. Tuning Chunk Size

In the current art, every block device is composed of a set of sectors, each of which has an equal "sector size", below which updates are indivisible. Thus, making the chunk size equal to this sector size produces the minimal set with this method. It is, however, slightly larger than the absolutely possible minimum set because of transactions which were committed by the replica of the original primary but not reported back to the original primary in time to be cleared in the original primary's bitmap at the time the disaster struck. Thus, under this model, we exceed the minimum possible set by at most the amount of data in the pipe to the replica (which is a tunable quantity on most systems). However, decreasing the chunk size correspondingly increases the size of the bitmap that needs to be transferred. Thus, tuning the chunk size against the bitmap size is an issue for the system developer and is not addressed further in this disclosure.

What is claimed is:

1. A process for replicating data between two data sets on permanent storage designated as primary and replica, where:
    (a) the subset of changes to the data being transmitted from the primary to the replica but not yet committed by the replica is recorded in a log, and
    (b) there exists an external mechanism for reversing the roles of the primary and the replica, and
    (c) on restoration of the original primary to service, a process for combining the log saved on the original primary with the log on the new primary such that the subset of data that needs to be transferred between the original and the new primaries to make the data on the original primary an exact duplicate of the data on the new primary is computed.

2. The process of claim 1 where the method of log combination begins with an intent log.

3. The process of claim 2 where the method of producing a combination of the logs of the original and new primaries is to
    (a) begin with a completely clean new intent log, then
    (b) for each sector in the log, make it dirty if
        i. the sector in the intent log of the new primary is marked dirty, or
        ii. the sector in the intent log of the original primary is marked dirty, or
        iii. the sector in the intent log of both the original and new primaries is marked dirty.

4. The process of claim 3 where the log on each of the volumes is not an intent log, but where each log is converted to an intent log prior to beginning the log combination process of claim 3.

5. The process of claim 1 where the method of logging is a transaction log.

6. The process of claim 5 where the method of producing a combination of the logs is to
    (a) convert the transaction logs of both the original and new primaries to intent logs, then
    (b) create a new, completely clean intent log for the replay, then
    (c) for each sector in the new intent log, make it dirty if
        i. the sector in the intent log of the new primary is marked dirty, or
        ii. the sector in the intent log of the original primary is marked dirty, or
        iii. the sector in the intent log of both the original and new primaries is marked dirty.

7. The process of claim 1 where the replication occurs within a single computer system.

8. The process of claim 1 where the replication occurs between two separate computer systems.

9. The process of claim 8 where the replication occurs over a computer network.

10. The process of claim 9 where both computer systems are geographically remote from each other over a Wide Area Network (WAN).

* * * * *